United States Patent [19]

Porter, Jr. et al.

[11] 3,713,872

[45] Jan. 30, 1973

[54] METHOD OF SPRAYING THERMOPLASTIC PAINT COMPOSITIONS

[75] Inventors: Samuel Porter, Jr., Tarentum; Donald P. Hart, Allison Park; Jerome A. Seiner, Pittsburgh, all of Pa.

[73] Assignee: PPG Industries, Inc., Pittsburgh, Pa.

[22] Filed: Feb. 1, 1971

[21] Appl. No.: 111,754

[52] U.S. Cl. ..................117/75, 117/73, 117/74, 117/104 R, 117/132 C, 117/161 UB, 177/161 UC, 117/161 ZB, 117/166, 260/17 R, 260/32.8 R, 260/33.2 R, 260/33.6 UA
[51] Int. Cl. .............................................B44d 1/08
[58] Field of Search ....117/104 R, 132 C, 75, 73, 74, 117/166, 161 UB, 161 UC

[56] References Cited

UNITED STATES PATENTS

| 3,194,777 | 7/1965 | Christenson et al. | 117/132 C X |
| 3,318,714 | 5/1967 | Coney et al. | 117/132 C X |
| 3,429,840 | 2/1969 | Lowe et al. | 117/132 C X |
| 2,849,409 | 8/1958 | Evans | 117/132 C X |
| 2,949,383 | 8/1960 | Blake | 117/132 C X |
| 3,055,851 | 9/1962 | Sanderson | 117/132 C X |
| 2,934,509 | 4/1960 | Crissey et al. | 117/75 X |

*Primary Examiner*—Ralph Husack
*Attorney*—Chisholm and Spencer

[57] ABSTRACT

A coating composition comprising a thermoplastic acrylic polymer in a solution wherein the polymeric solution, devoid of pigment, has a surface tension of less than 25.2 dynes per centimeter at room temperature is particularly useful as an automotive top coating. The coating compositions, when sprayed onto substrates, exhibit increased efficiency of paint deposited per unit of paint sprayed.

12 Claims, No Drawings

METHOD OF SPRAYING THERMOPLASTIC PAINT COMPOSITIONS

Coatings of thermoplastic acrylic polymers have been used for some time now in the automotive industry because of their fine appearance and protective qualities. These coatings, as well as other industrial coatings, are generally applied by spraying.

In order to form the thermoplastic acrylic polymer, the acrylic monomers are polymerized in a volatile solvent which is compatable with the acrylic polymer formed (active solvent) so that the coating composition is in solution ready for use.

The solution of thermoplastic acrylic polymer in active solvent is then thinned with other solvents or diluents to achieve a consistency proper for spraying.

A major problem of spraying substrates such as automobile bodies and equipment is that up until this time, only a very low coating efficiency was possible. That is, because of overspray and rebounding of paint off the substrate, only about half of the paint solids going through the spray gun was actually deposited on the substrate.

Due to the necessity of obtaining good appearance, and a total topcoat film build of at least about 2 mils, and the spray gun capabilities, and the problem outlined above, the prior art has found difficulty in achieving a proper automotive topcoating with less than three coats of paint. That is, the entire substrate to be topcoated must be passed through the spray unit at least three times. One coat of paint is generally defined in terms of production painting as the spraying time between two flash periods (periods of evaporation of solvents).

As the three-coat system requires a great deal of time and process expense, considerable effort has been expended by the paint industry to obtain a two-coat system whereby the same coating formerly obtained by three coats could be obtained using only two coats of paint.

It has no been discovered that if a solution of thermoplastic acrylic polymer in an active solvent wherein the polymer solution devoid of pigments has a surface tension of less than 25.2 dynes per centimeter at room temperature is used as the composition at the spray gun, a two-coat system will produce a film at least equal in thickness and appearance to those formed from three-coat systems in the past. It has been found that not only is it possible to obtain a two-coat film build but that unexpectedly approximately 50 percent less paint is used than used in the prior art system. With the use of the system of this invention the costs of coating automotive and other substrates are reduced enormously, and the hazards or annoyances incidental to overspray are reduced.

The thermoplastic acrylic polymers are generally prepared by polymerizing the acrylic monomers in an active solvent for the polymer formed or a volatile solvent which is compatable with the polymer formed. Additional solvents or diluents (non-solvents) are then added to the solution to thin the composition to a spraying consistency. It is critical that the composition devoid of pigment at the spray gun have a surface tension of less than 25.2 dynes per centimeter at room temperature as it has been discovered that those compositions having a surface tension of greater than 25.2 dynes per centimeter require three coats for a 2 mil film with good appearance and the efficiency of paint transfer from the spray gun to the substrate will be uneconomical.

The critical surface tension measurement is taken to be that surface tension measured when the composition is devoid of pigments since the inclusion of pigments has an effect on the surface tension of the paint composition. Thus, although each color coating containing different pigments may have varying surface tension values, the relationship of surface tension to the efficiency and ability to form a two-coat build remains the same. Thus, if a coating composition is measured at 25.2 dynes per centimeter or lower without the pigments, even though the pigments added will lower the surface tension of the paint composition, the increased efficiency and film build will be attained.

The thermoplastic acrylic polymer is generally an ester of acrylic or methacrylic acid or a copolymer of such an ester with another copolymerizable monomer. Suitable esters include those of alcohols containing about one to sixteen carbon atoms, such as methyl acrylate, methyl methacrylate, ethyl acrylate, butyl acrylate, n-butyl methacrylate, octyl acrylate, lauryl methacrylate, stearyl methacrylate, and 2-ethoxy-ethyl methacrylate. Mixtures of such esters may be copolymerized or one or more of the esters may be copolymerized with a higher alkyl ester or amide of acrylic or methacrylic acid or with another monomer containing a copolymerizable vinyl group, e.g., itaconate esters, maleate esters and allyl compounds. The preferable acrylic polymers in this invention are the alkyl methacrylates or acrylates and, more specifically, poly(methyl methacrylate) and copolymers such as copolymers of methyl methacrylate and butyl acrylate. Blends of the above acrylics with other resins such as epoxys, cellulose acetate butyrate, nitrocellulose and the like may be used. It is preferred that the acrylic polymer comprise at least about 40 percent by weight of the blend.

The thermoplastic acrylic polymers are generally formed by polymerizing the acrylic monomers in an active solvent for the polymerized monomer. An active solvent is one which is volatile and is compatable with the thermoplastic acrylic polymer. These solvents actually dissolve the polymers.

The active solvents which are useful herein are either aromatic hydrocarbons or oxygenated solvents such as esters, ketones, ethers, ether alcohols, and halogenated hydrocarbons. Examples of these active solvents are ethoxyethyl acetate (Cellosolve acetate), 2,2,4-trimethyl-1,3-pentanediol monoisobutyrate, acetone, toluene, methyl ethyl ketone, methyl isobutyl ketone, disisobutyl ketone, methyl isoamyl ketone, diethyl ether, amyl acetate, butyl acetate, ethylene glycol diacetate, cyclohexanone, trichlorotrifluoroethane, trichloromonofluoromethane, 2-nitro propane and the like.

To the polymer and active solvent must then be added sufficient additional solvent or diluent (non-solvent) to achieve proper spray viscosity and to achieve the proper surface tension of the polymer solution.

The preferred thinners contain diluents. Some examples of diluents which may be used herein are those liquid materials which do not dissolve or are not compatible with the acrylic polymers to any appreciable extent and are miscible with the active solvents. Examples of non-solvents which have been found useful in this invention are the liquid aliphatic hydrocarbons such as hexane, heptane, octane, pentane and VM&P naphtha. Other non-solvents which may be used are alcohols such as methanol, isopropyl alcohol and the like.

It is noted that mixtures of various active and non-active solvents may be used herein. It is preferred, in fact, to use mixtures of toluene, acetone and ethoxyethyl acetate as the active solvent portion of the solution. The preferred non-solvents are hexane and heptane.

It is absolutely necessary that the active and non-active solvents be balanced so that the polymer is not precipitated and the polymer solution without pigment to be sprayed has a surface tension of less than 25.2 dynes per centimeter at room temperature.

The surface of any liquid solution possesses special properties which are due to the unbalanced forces of molecular attraction at the surface. The molecules at the surface are pulled inward by the other molecules of the liquid and the liquid tends to adjust itself to give the minimum free energy surface. The surface tension of a liquid (in this case the polymeric solution) is defined as the force per centimeter on the surface of the liquid which opposes the expansion of the surface area and is expressed in dynes per centimeter.

Thus, the surface tension is measured by suspending a ring of platinum wire in the body of the liquid and the force required to lift the ring from the surface of the liquid is measured. (see University Physics, Sears and Zemansky, 2nd edition, Addison-Wesley Publishing Company, Cambridge, Massachusetts (1955) and Physical Chemistry of Surfaces, Arthur D. Adamson, 2nd edition, Interscience Publishers, New York (1967) pp. 24–26).

The means of measuring the surface tension of the polymer solutions of this invention is by the du Nouy method which is a standard ASTM-D1331 method. The measurements are made at room temperature (about 72°F.) as the fluctuations of temperature will affect the surface tension of a liquid. The du Nouy apparatus is calibrated by setting the force at 72 dynes per centimeter for a standard liquid of distilled water.

It has also been found that even more accurate readings may be obtained when using reagent grade xylene having a surface tension of 30.1 dynes per centimeter as an additional standard for calibration.

It is noted that the actual temperature at the spray unit is approximately 68°F. and the surface tension of the composition will be slightly higher than at room temperature.

The low surface tension of the polymer solution is generally obtained by balancing the solvents used. Thus, if a non-solvent having a low surface tension is used such as hexane, enough hexane is used to lower the surface tension of the composition to less than 25.2 dynes per centimeter but not enough to turn the solution from a true solution to a dispersion. It is also possible to balance the properties of active solvents to achieve lower surface tensions of the final compositions by substituting lower surface tension active solvents like diisobutyl ketone for higher surface tension solvents such as toluene and cellosolve acetate.

The surface tension of the mixture must be measured when balancing solvents as the surface tension of a blend may not follow linearly by averaging the surface tension values of the individual constituents. (See Physical Chemistry of Surfaces, p. 74).

Although the preferred method of achieving lower surface tension compositions is by adding liquid aliphatic hydrocarbon (non-solvents) to the polymer solutions, it is also possible to use only active solvents wherein the thinner contains enough diethyl ether or other active solvent having a low surface tension to lower the surface tension of the composition to less than 25.2 dynes per centimeter and also obtain a two-coat thickness with some increase in paint efficiency.

It may also be desirable to balance solvents having other properties such as certain viscosity levels, evaporation rates, and the like to achieve desired results. It has been found here however, that the most important property which bears upon the possibility of obtaining acceptable automotive two-coat film builds of thermoplastic acrylic polymer solutions with increased paint efficiency is the low surface tension of the compositions.

A preferred composition to be sprayed comprises a copolymer of methyl methacrylate and butyl acrylate in a solvent solution comprising about 9 percent by volume of the acrylic copolymer, about 2 percent by volume of cellulose acetate butyrate, about 2 percent by volume of plasticizer, about 25.5 percent by volume of hexane, about 27.5 percent by volume of toluene, about 4.0 percent by volume of ethylene glycol diacetate, about 21.0 percent by volume of ethoxyethyl acetate and about 9 percent by volume of acetone wherein the paint composition has a surface tension of about 21.8 dynes per centimeter at room temperature.

Although clear coatings may be made from unpigmented compositions, it is generally preferred to add pigments to the paint compositions to be sprayed. Examples of pigments used are titanium dioxide, carbon black, red oxide, phthalo blue, aluminum powder, yellow iron oxide and the like. In general, any pigment or filler which is common in the paint industry may be added to the coating composition. The critical surface tension of the composition must still be measured at room temperature without the added pigments.

For automotive coatings it is also generally desirable to add cellulosic materials such as cellulose acetate butyrate or nitrocellulose to the acrylic solution to improve the metallic orientation if metallic pigments are used. In the preferred embodiment of this invention, cellulose acetate butyrate is added to the paint composition to be sprayed in amounts of from about 2 to about 30 percent by weight of the paint composition.

Some conventional external plasticizers commonly used for acrylic solutions are generally added to the paint composition of this invention. Examples of these plasticizers are dibutyl phthalate, butyl benzyl phthalate, diisooctyl phthalate, decyl butyl phthalate, diisooctyl adipate, dibutyl sebacate, butyl benzoate, triisooctyl trimellitate, di-n-octyl n-decyl trimellitate, tricresyl phosphate, polymeric plasticizers such as polyesters with or without oil modification and the like. The acrylic solutions generally comprise about 5 to about 35 percent by weight of the plasticizer.

The paint composition may be sprayed onto any substrate such as metal, primed metal, wood, plastic, or the like using any conventional spraying apparatus.

The film build of a thermoplastic topcoating required in the automotive industry is generally at least about 2 mils in thickness. Thus, if a polymer solution has a surface tension of less than 25.2 dynes per centimeter the substrate will be coated with at least a 2 mil thickness of paint after only 2 passes in the spraying equipment. The conventional automotive spray unit is set at a certain fluid feed rate and at these feed rates, the prior art thermoplastic coating solutions can attain a total film build on the substrate of only about 0.7 mil per coat. As the automotive requirements call for film builds of about 2 mils, the substrate must be coated three times. If one attempts to solve the film build problem by increasing the fluid feed rate to achieve the 2 mil film build in only two coats, the appearance of the resulting film is unacceptable due to flooding of the solution on the substrate resulting in running and paint sag. This problem cannot be alleviated by simply allowing the spray gun to coat the substrate for a longer period of time per coat as the mass production of automobiles requires a limited time for topcoating each unit and the process cannot be slowed down economically and the appearance will also suffer.

Using the process of this invention, however, a two-coat film build of 2 mils or greater can be achieved at the standard fluid feed rate, spraying each substrate for the same amount of time. Therefore, a greater efficiency of paint use is achieved than that achieved by the prior art methods. The paint efficiency is measured by spraying a measured volume of paint solids in the solution at the spray gun and measuring the resulting amount of paint deposited on the substrate. Thus the efficiency of the compositions of the instant invention are compared to prior art solutions by spraying like amounts of each solution at equal volume solids at the same feed rates and measuring the film deposition. It has been found that the efficiency of the spray paints of the compositions of this invention are unexpectedly superior to those of the prior art. Thus, using the method of this invention, substrates such as automotive materials may be coated with less paint to achieve the same or greater film builds resulting in an appreciable savings.

The coating composition described may be used as a coating for all types of substrates. Preferably the composition is sprayed onto both primed and unprimed metals such as aluminum and steel.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLES 1–7

A thermoplastic acrylic polymer solution was formed by blending 172 parts of a mixture of a 35 percent solids solution of a copolymer comprising 90 percent methyl methacrylate, and 10 percent butyl acrylate in toluene with 20 parts of cellulose acetate butyrate and 20 parts of butyl benzyl phthalate and forming a 30 percent solids solution in a solvent solution comprising 55 parts of toluene 35 parts of acetone and 10 parts of cellosolve acetate.

The above pigmentless composition was thinned with 100 percent by volume of the solvent blends below and sprayed onto metal plates using the identical spray gun settings for the same periods of time. All spraying rates were based on a delivery rate of 730 ccs of xylene per minute.

The following are the results:

| Percent solvent | Example | | | | | | | Control | | |
|---|---|---|---|---|---|---|---|---|---|---|
| | 1 | 2 | 3 | 4 | 5 | 6 | 7 | A | B | C |
| Toluene | 17 | | 17 | 17 | 17 | 17 | 17 | 31 | | |
| Cellosolve acetate | 25 | 20 | 25 | 25 | 25 | 25 | 25 | 18 | | |
| Acetone | | 27 | | | | 50 | | 14 | | |
| Xylene | | | | | | | | 14 | | |
| Ethylene glycol diacetate | 8 | 8 | 8 | 8 | 8 | 8 | 8 | 7 | | |
| Lactol spirits [1] | | | | | | | | 6 | | |
| Diacetone alcohol | | | | | | | | 10 | | |
| Hexane | 50 | 45 | | | | | | | | |
| 2-propanol | | | 50 | | | | | | | |
| 2-nitropropane | | | | | | | | | 100 | |
| Cyclohexane | | | | | | | 50 | | | 100 |
| Diethyl ether | | | | 50 | | | | | | |
| Trichlorotrifluoromethane | | | | | 50 | | | | | |
| Surface tension (dynes/cm.) | 21.8 | 21.2 | 23.0 | 22.4 | 24.6 | 25.2 | 24.4 | 26.0 | 27.0 | 29.7 |
| Film build (mils) | 2.6 | 2.8 | 2.4 | 1.9 | 2.2 | 2.0 | 2.0 | 1.6 | 1.5 | 1.1 |
| Efficiency (mils/cc. paint) | 0.072 | 0.072 | 0.065 | 0.061 | 0.061 | 0.055 | 0.055 | 0.042 | 0.043 | 0.039 |

[1] Comprises naphtha and having a specific gravity of 0.735 and a maximum of 20 percent by volume of ethylbenzene branched ketones, trichloroethylene or toluene.

As seen from the above examples those coating compositions having a surface tension of less than 25.2 dynes per centimeter are markedly superior to the coating compositions having a surface tension greater than 25.2 dynes per centimeter in both film build and efficiency.

EXAMPLE 8

A thermoplastic acrylic polymer solution was formed by blending a mixture of 172 parts of a 35 percent solids solution of a copolymer comprising 90 percent methyl methacrylate and 10 percent butyl acrylate in toluene, 23.5 parts of an 85 percent solids solution of cocoanut glycerol phthalate polyester plasticizer having a molecular weight of about 1,200 in xylene, and 20 parts of cellulose acetate butyrate. The above polymer mixture was put in solution by adding enough of a solvent system comprising 17 percent toluene, 65 percent acetone, and 18 percent cellosolve acetate to obtain a 30 percent solids solution.

The above solution was pigmented to a metallic blue color by adding 1.5 part of aluminum flake and 0.5 part of phthalo blue pigment to 333 parts of the above solution.

The pigmented solution was then thinned for spraying by adding one part by volume of the pigmented solution to one part by volume of a solvent solution comprising 50 percent hexane, 17 percent toluene, 25 percent ethoxyethyl acetate, and 8 percent ethylene glycol diacetate. The surface tension of the resulting solution was 21.6 dynes per centimeter (21.8 dynes per centimeter clear).

The unexpected film build and efficiency of the above material when sprayed onto a metal plate was demonstrated by comparing the above composition to the commercial acrylic polymer solution being used in the automotive industry at the present time which consists of thinning the above pigmented thermoplastic polymer solution with 100 percent by volume of a solvent solution comprising 6 percent lactol spirits, 14 percent xylene, 31 percent toluene, 14 percent acetone, 18 percent ethoxyethyl acetate, 10 percent diacetone alcohol and 7 percent ethylene glycol diacetate wherein the final solution at the spray gun had a surface tension of 23.5 dynes per centimeter (26.0 dynes per centimeter clear).

The two lacquers were sprayed on an automatic spray machine with exactly the same setting. The spray units were set to deliver 700 cc of toluene per minute and the paint compositions were sprayed at that setting. Two coats of lacquer were applied in both cases. The following illustrates the results of this test:

| Lacquer | Viscosity No. 1 Fisher Cup | Total Paint Solids Used | Film deposited | Film appearance |
|---|---|---|---|---|
| Example 8 | 68 Sec. | 290 cc | 3 mil | excellent |
| Commercial Lacquer | 56 Sec. | 285 cc | 2 mil | excellent |

Thus it is seen that the film build of example 8 is 50 percent better than that of the commercial lacquer and that the total amount of paint used was approximately the same so that the efficiency was approximately 50 percent higher than that of the commercial lacquer.

EXAMPLES 9-12

A thermoplastic acrylic polymer solution was prepared by blending 161 parts of a 36 percent solids solution of a copolymer of 90 percent methyl methacrylate and 10 percent butyl acrylate in toluene, 26 parts of a plasticizer comprising an 85 percent solids solution of polymeric polyester comprising 60 percent glyceryl phthalate and 40 percent oil having a molecular weight of about 1,200 in xylene and 20 parts of cellulose acetate butyrate.

The above polymer blend was reduced with thinner by adding enough of a solvent solution comprising 17 percent toluene, 65 percent acetone, and 18 percent cellosolve acetate to obtain a 30 percent solids solution.

The above polymer solutions were pigmented by adding about 1.5 parts of aluminum flake and about 0.5 part of phthalo blue pigment to 333 parts of the above solution.

The above pigmented polymer solutions were then thinned with 100 percent by volume with the following solvent solutions and sprayed at identical spraying conditions for two coats on a metal panel. The following table shows the results of the film build:

| | Example | | | | Control |
|---|---|---|---|---|---|
| | 9 | 10 | 11 | 12 | |
| % Pentane | 50 | — | — | — | — |
| % Hexane | — | 50 | — | — | — |
| % Heptane | — | — | 50 | — | — |
| % Octane | — | — | — | 50 | — |
| % Cellosolve Acetate | 25 | 25 | 25 | 25 | 18 |
| % Toluene | 17 | 17 | 17 | 17 | 31 |
| % Ethylene Glycol Diacetate | 8 | 8 | 8 | 8 | 7 |
| % Diacetone Alcohol | — | — | — | — | 10 |
| % Acetone | — | — | — | — | 14 |
| % Xylene | — | — | — | — | 14 |
| % Lactol Spirits | — | — | — | — | 6 |
| Surface Tension (dynes/cm.) | 21.3 | 21.7 | 22.1 | 23.1 | 25.6 |
| Film Build (mils) | 2.2 | 2.2 | 2.2 | 2.3 | 1.6 |

Thus it is seen that all those examples having a lower surface tension achieve a superior film build to the control having a greater surface tension.

EXAMPLE 13

A polymer solution was formed as in example 9. The solution was pigmented to a beige color by adding 28.7 parts of $TiO_2$, 1.5 parts of indo yellow pigment, 0.08 part of carbon black and 0.3 part of red iron oxide to 333 parts of the polymer solution.

The above composition was then thinned for spraying by adding 100 percent by volume of a solvent solution comprising 50 percent hexane, 17 percent toluene, 25 percent cellosolve acetate and 8 percent ethylene glycol diacetate and two coats were sprayed onto a metal panel. This was compared to the same composition thinned with 100 percent by volume of the commercial thinner of example 8 using the same spray conditions. The following are the results of the film builds obtained:

| Example | Surface Tension | CC of Paint Solids Used | Film Build (mils) |
|---|---|---|---|
| 13 | 21.4 | 225 | 2.5 |
| Control | 25.0 | 200 | 1.8 |

EXAMPLES 14-15

A polymer solution was formed as in example 9.

The solution was pigmented to a black color by adding 1.7 parts of carbon black to 333 parts of the polymer solution.

The resulting pigmented polymer solution was thinned using the various solvent solutions below. The results of film build and efficiency in mils of film deposited per cc of paint used are given below:

| Volume % | 14 | Control A | Example 15 | Control D | Control E |
|---|---|---|---|---|---|
| % Toluene | 17 | 35 | 17 | — | — |
| % Cellosolve Acetate | 25 | 20 | 25 | — | — |
| % Acetone | — | 15 | — | — | — |
| % Xylene | — | 15 | — | — | — |
| % Ethylene Glycol Diacetate | 8 | 8 | 8 | — | — |
| % Lactol Spirits | — | 7 | — | — | — |
| % Hexane | 50 | — | — | — | — |
| % 2-propanol | — | — | 50 | — | — |
| % 2-nitro propane | — | — | — | 100 | — |
| % Cyclohexanone | — | — | — | — | 100 |
| Surface Tension (Dynes/cm.) | 20.2 | 24.3 | 22.8 | 24.3 | 24.6 |
| Film Build (mils) | 2.3 | 1.8 | 1.7[1] | 1.4 | 1.3 |
| Efficiency (mils/cc.) | 0.063 | 0.046 | 0.054 | 0.045 | 0.043 |

1. It is noted that other pigmented solutions using the isopropyl alcohol as a diluent show film builds similar to that obtained in Example 14 (see Example 7).

EXAMPLE 16

A polymer solution was formed as in example 9.

The polymer solution was pigmented to a white color by adding 45 parts of $TiO_2$ to 333 parts of the polymer solution.

The pigmented solution was thinned with 100 percent by volume of a solvent comprising 50 percent hexane, 25 percent cellosolve acetate, 17 percent toluene and 8 percent ethylene glycol diacetate and sprayed on to a metal panel. This was compared to a thinning of the same pigmented polymer solution with 100 percent by volume of the commercial thinner of example 1 and spraying under the same conditions. The results are as follows:

| Example | Surface Tension (dynes/cm.) | Total Paint Solids Used(cc) | Film Build (mils) | Efficiency (mils/cc) |
|---|---|---|---|---|
| 16 | 21.3 | 36.8 | 2.4 | 0.065 |
| Control | 23.4 | 40.4 | 1.6 | 0.039 |

EXAMPLE 17

A polymer solution was prepared by blending 24 percent by weight of a 50 percent methyl methacrylate polymer blended with 50 percent epoxy resin with 76 percent by weight of a solvent blend comprising 50.4 percent by volume of toluene, 32.5 percent by volume of ethyl cellosolve, 13 percent by volume of methyl ethyl ketone, 2.0 percent by volume of acetone, and 2.0 percent by volume of isopropyl alcohol.

The above polymer solution was thinned by adding 37.5 parts by volume of a solvent solution comprising 48 percent of hexane, 19 percent toluol, 15 percent ethylene glycol diacetate and 18 percent cellosolve acetate to 100 parts by volume of the solution.

The above solution was pigmented by adding 12 parts of calcined clay, 10 parts of talc, 13.6 parts of $TiO_2$, 2.5 parts of calcium chromate, and 1.7 parts of carbon black to 100 parts of the polymer solids.

The above was compared to the same polymer solution which was thinned with a commercial solvent blend comprising 34 percent toluene, 8 percent acetone, 24 percent cellosolve acetate, 9 percent ethylene glycol diacetate, 9 percent lactol spirits, and 16 percent xylene to achieve a 45 percent by volume reduction and sprayed under the same conditions.

The film builds of both materials after one coating were as follows:

| Example | Surface Tension (dynes/cm.) | Film Build (mils) | Unreduced Paint Used |
|---|---|---|---|
| Control | 24.6 | 0.6 | 107 cc |
| 17 | 21.4 | 0.9 | 109 cc |

According to the provisions of the patent statutes, there is described above the invention and what are now considered to be its best embodiments. However, within the scope of the appended claims, it is to be understood that the invention can be practiced otherwise than as specifically described.

We claim:

1. The method of spraying a paint composition to obtain an increased efficiency of paint depositing on the substrate after spraying comprising spraying onto a substrate a paint composition comprising a thermoplastic acrylic polymer in a solvent solution comprising a volatile solvent compatible with the acrylic polymer wherein the polymeric solution devoid of pigment has a surface tension of less than 25.2 dynes per centimeter at room temperature.

2. The method of claim 1 wherein the substrate is primed metal.

3. The method of claim 1 wherein the solvent solution comprises a blend of volatile solvents compatable with the acrylic polymer and a diluent which is a nonsolvent for the acrylic polymer.

4. The method of claim 3 wherein the diluent is a liquid aliphatic hydrocarbon.

5. The method of claim 1 wherein the paint composition additionally contains pigments.

6. The method of claim 1 wherein the paint composition additionally contains from about 2 to about 30 percent by weight of a soluble cellulosic material.

7. The method of claim 6 wherein the cellulosic material is cellulose acetate butyrate.

8. The method of claim 1 wherein the paint composition additionally contains an external plasticizer.

9. The method of claim 1 wherein the thermoplastic acrylic polymer is a blend of a polymer of alkyl acrylate or methacrylate with an epoxy resin wherein the blend comprises at least 40 percent by weight of the alkyl acrylate or methacrylate.

10. The method of claim 1 wherein a volatile solvent compatible with the acrylic polymer is diethyl ether.

11. The method of claim 1 wherein a volatile solvent compatable with the acrylic polymer is toluene.

12. The method of claim 1 wherein a volatile solvent compatable with the acrylic polymer is acetone.

* * * * *